(12) United States Patent
Furuya et al.

(10) Patent No.: US 9,798,602 B2
(45) Date of Patent: *Oct. 24, 2017

(54) WATCHDOG CIRCUIT, POWER IC AND WATCHDOG MONITOR SYSTEM

(71) Applicant: Renesas Electronics Corporation, Tokyo (JP)

(72) Inventors: Toshiaki Furuya, Kawasaki (JP); Osamu Watanabe, Kawasaki (JP); Satoshi Kondo, Kawasaki (JP)

(73) Assignee: Renesas Electronics Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/953,403

(22) Filed: Nov. 29, 2015

(65) Prior Publication Data

US 2016/0077909 A1    Mar. 17, 2016

Related U.S. Application Data

(63) Continuation of application No. 13/754,982, filed on Jan. 31, 2013, now Pat. No. 9,229,521.

(30) Foreign Application Priority Data

Feb. 1, 2012   (JP) ................................ 2012-019844
Sep. 26, 2012  (JP) ................................ 2012-212291

(51) Int. Cl.
   *G06F 11/07*   (2006.01)
   *G06F 1/32*    (2006.01)
   *G06F 1/24*    (2006.01)

(52) U.S. Cl.
   CPC ............ *G06F 11/0757* (2013.01); *G06F 1/24* (2013.01); *G06F 1/3203* (2013.01);
   (Continued)

(58) Field of Classification Search
   CPC ............ G06F 11/0721; G06F 11/0757; G06F 11/079; G06F 1/24; G06F 1/3203; G06F 1/3234; Y02B 60/32
   See application file for complete search history.

(56) References Cited

U.S. PATENT DOCUMENTS 4,594,685 A   6/1986 Owens
4,752,930 A   6/1988 Kitamura et al.
(Continued)

FOREIGN PATENT DOCUMENTS

JP    2003-300438 A      10/2003
JP    2007156574 A   *   6/2007

OTHER PUBLICATIONS

Extended European search report issued May 23, 2013, in European Patent Application No. 13153407.5.

*Primary Examiner* — Thomas Lee
*Assistant Examiner* — Chad Erdman
(74) *Attorney, Agent, or Firm* — Shapiro, Gabor and Rosenberger, PLLC

(57) ABSTRACT

A watchdog timer circuit for use in microcomputer monitor systems is disclosed. This circuit includes a timer circuit responsive to receipt of a count clock signal for counting it up, and a timer control circuit which loads an externally inputted data signal (stn) in sync with a timer refresh instruction (prun) and holds therein a sequentially loaded latest multi-bit data signal as reference data. When the reference data agrees with a predefined pattern and simultaneously another prespecified condition is met, the timer control circuit interrupts the clock signal counting operation of the timer circuit. During interruption of the counting operation, when the reference data does not agree with the predefined pattern or when the above-stated another prespecified condition becomes unsatisfied, the control circuit (Continued)

allows the timer circuit to restart the clock signal counting operation.

6 Claims, 9 Drawing Sheets

(52) U.S. Cl.
CPC .......... G06F 1/3234 (2013.01); G06F 11/079 (2013.01); G06F 11/0721 (2013.01); Y02B 60/32 (2013.01)

(56) References Cited

U.S. PATENT DOCUMENTS

| | | | |
|---|---|---|---|
| 5,175,845 A | 12/1992 | Little | |
| 5,233,613 A | 8/1993 | Allen | |
| 5,506,487 A | 4/1996 | Young et al. | |
| 5,528,756 A | 6/1996 | Molnar | |
| 6,385,274 B1 | 5/2002 | Nohara | |
| 6,438,462 B1* | 8/2002 | Hanf | G06F 1/3203 340/693.4 |
| 6,523,126 B1 | 2/2003 | Brabenac | |
| 2001/0032319 A1* | 10/2001 | Setlak | G06F 21/32 726/19 |
| 2006/0068855 A1* | 3/2006 | Miyazaki | H04W 52/0251 455/574 |
| 2008/0184055 A1* | 7/2008 | Moyer | G06F 11/0721 713/502 |
| 2008/0249811 A1 | 10/2008 | Qiao et al. | |
| 2012/0054526 A1 | 3/2012 | Sugitachi | |

* cited by examiner

WATCHDOG CIRCUIT, POWER IC AND WATCHDOG MONITOR SYSTEM

INCORPORATION BY REFERENCE

The present application claims priorities from Japanese applications JP2012-019844 filed on Feb. 1, 2012 and JP2012-212291 filed on Sep. 26, 2012, the contents of which are hereby incorporated by reference into this application.

BACKGROUND OF THE INVENTION

The present invention relates to watchdog timer circuitry, power integrated circuit (IC) devices and watchdog monitor systems using the same. For example, this invention relates to a technique effectively used in electronic control units (ECUs) for motor vehicles.

A watchdog timer (WDT) is used as a mechanism to detect improper operations due to runaway of a software program running on a microcomputer. More specifically, when the program is normally running on the microcomputer, the WDT is repeatedly initialized a timer count value before a time-out occurs by the microcomputer's operation. Upon occurrence of abnormality due to the runaway or else, the microcomputer does not perform such periodical timer count value initialization operation. In responding to the timeout, the WDT generates a reset-inducing signal and supplies it to the microcomputer.

The microcomputer has a low power consumption mode, such as a stand-by mode, in which is stopped a command executing operation performed by a central processing unit (CPU). Accordingly, in a system having its microcomputer with WDT externally attached thereto, even when the microcomputer is set in the low power consumption mode, the microcomputer is reset in each event if the timer counter's timeout is not suppressed, making it impossible to realize any low power consumption. Then, the WDT's operation is interrupted in the low power consumption state of the microcomputer whereby it will no longer happen that reset is instructed every time the timer counter experiences its timeout. In addition, it is no longer required to perform in each event the processing for initialization of the timer counter's count value by releasing the low power consumption state of the microcomputer just before the timeout of the timer counter. For example, JP-A-2003-300438 discloses therein a technique for causing a CPU to deactivate a watchdog IC having a watchdog timer in responding to turn-off of an ignition switch of motor vehicle and for preventing a reset signal from being output to the CPU. In such case, this document takes into consideration the following fact: with mere use of the watchdog timer circuit for monitoring the CPU operation by means of an active signal to be input from the CPU, once the watchdog timer is deactivated due to the CPU's runaway, the CPU is unable to make the watchdog timer circuit active while at the same time losing the reset functionality with respect to the CPU. In view of this, JP-A-2003-300438 proposes to employ the function of forcibly activating the watchdog timer when communication is performed by a communication interface and even when the ignition switch is driven to turn on.

SUMMARY OF THE INVENTION

A study has been conducted as to reliability improvement and low power consumption of a system using watchdog timer circuitry. From a viewpoint of low power consumption, it is desirable to interrupt the timer count operation of the watchdog timer circuit in the microcomputer's low power consumption state; however, when the operation of watchdog timer circuit is interrupted by error, it is no longer possible to maintain the reliability of the system. Embodiments can provide a reliable and stable watchdog timer and to prevent an inadvertent halted state of the watchdog timer. JP-A-2003-300438 fails to take account of this point.

Additionally, JP-A-2003-300438 discloses therein a technique for performing recovery in response to an ignition switch manipulation and/or communication interface operation as a recovery method for use in events of unintentional interruption occurring due to noise or runaway in cases where the watchdog timer circuit is stoppable and operation-restartable under the control of CPU. However, this document is silent about an approach which follows: even when the watchdog timer circuit's timer count operation is interrupted due to the CPU's runaway, it is ensured that the watchdog timer circuit instantly restarts its time count operation to thereby go into a reset-instructable state.

It is therefore an object of this invention to prevent the watchdog timer circuit from halting unwantedly and also to make it possible, even upon occurrence of such unwanted deactivation, to detect this event and enable the watchdog timer circuit to quickly recover to its operable state without difficulty.

This and other objects, new features and advantages of the invention will be apparent from the following more particular description of currently preferred embodiments of the invention, as illustrated in the accompanying drawings.

A brief summary of a representative one of the means for attaining the object of the invention disclosed herein is as follows.

Circuitry incorporating principles of this invention is arranged to have a timer circuit responsive to receipt of a count clock signal for counting it up, and a timer control circuit for loading or "importing" an externally inputted data signal in sync with a timer refresh instruction, for holding therein a sequentially loaded latest multi-bit data signal as reference data, for inhibiting a count clock signal counting operation of the timer circuit when the reference data is identical with a predefined pattern and simultaneously another prespecified condition is satisfied, and for permitting restart of the clock signal counting operation of the timer circuit when the reference data becomes non-identical with the predefined pattern or alternatively when the aforementioned another prespecified condition becomes unsatisfied while the counting operation is being inhibited.

An advantage obtainable by the representative one of the means for attaining the object of this invention disclosed herein is as follows.

It is possible to prevent the watchdog timer circuit from halting unwantedly and also to enable, even upon occurrence of such unwanted rundown, detection of this event to thereby ensure that the watchdog timer circuit is able to readily and quickly recover to its operable state.

Other objects, features and advantages of the invention will become apparent from the following description of the embodiments of the invention taken in conjunction with the accompanying drawings.

DESCRIPTION OF THE EMBODIMENTS

1. Embodiment Summary

Figure 1:
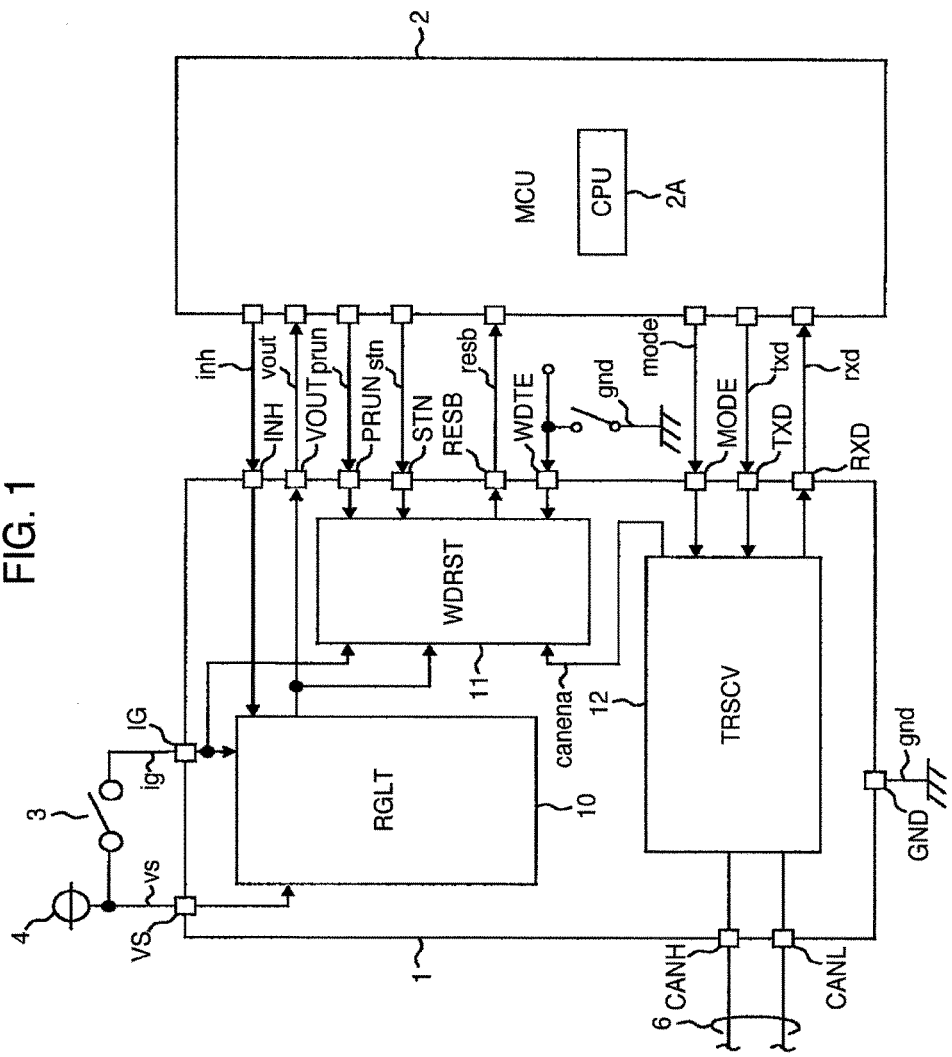
FIG. 1 is a block diagram showing an exemplary circuit configuration of a watchdog monitor system in accordance with one embodiment of this invention.

An explanation will first be given of a summary of representative embodiments of the invention as disclosed herein. It should be noted that reference signs placed between parentheses in the following summary of representative embodiments are merely for exemplification of ones involved in the concepts of constituent elements designated thereby.

(1) <Stop/Restart Control of Timer Count Operation in Response to Signal Input Pattern Sent in Sync with Timer Refresh Instruction>

A watchdog timer circuit (40, 40A) in accordance with one representative embodiment of this invention is arranged to serially load and hold therein a data signal (stn) from an external terminal (PRUN) in synchronization with a timer refresh instruction (prun), received from the external terminal (PRUN), while letting a state in which the latest multiple-bit data signal held therein is identical with a predefined pattern be a necessary condition for interruption of a timer count operation, and letting a state in which the identical state is changed due to subsequent loading of a data signal from the external terminal in sync with the timer refresh instruction be a sufficient condition for restart of the timer count operation.

Note that references to "PRUN" (in capital letters) herein refers to the external terminal for receiving a control signal from an outside circuit, and references to "prun" (in lower case letters) refers to an associated control signal which is the refresh instruction, or refresh signal, for the watchdog timer.

With such the arrangement, concordance of two or more bits is required for consonance of a pattern used to stop the timer count operation; so, the watchdog timer circuit is no longer easily rendered inoperative. Further, even when the concordance of a multi-bit data signal with a predefined pattern due to runaway of CPU or like malfunctions results in the timer count operation being stopped accidentally, it is assumable that if the same CPU's obstruction such as the runaway continues then a state will appear soon afterward in which the multi-bit data signal being held is changed in at least one bit thereof whereby it is possible to detect any accidentally occurred operation interruption so that it is possible to force the erroneously deactivated watchdog timer circuit to instantly recover to its operable state without difficulty. In short, the watchdog timer circuit offers advantages which follow: its operation is hardly stopped by error; even when the operation is stopped erroneously, the circuit is made easier to quickly recover to its operable state.

(2) <Stop/Restart Control of Timer Count Operation Responsive to Signal Input Pattern Sent in Sync with Timer Refresh Instruction>

A watchdog timer circuit (40, 40A) in accordance with the representative embodiment has a timer circuit (30) which counts a count clock signal (CCK) from its initial value to provide a count value—this value is initialized based on a timer refresh instruction (prun) to be externally input thereto—and generates a reset instruction (wdres) when the count value reaches a time-out value. The circuit further has a timer control circuit (20) for loading or "importing" a predetermined data signal (stn) to be externally input thereto in sync with the timer refresh instruction, for holding therein the sequentially loaded multi-bit data signal as reference data, for inhibiting a count clock signal counting operation to be performed by the timer circuit when the reference data being held therein is identical with a predefined pattern and simultaneously another prespecified condition is satisfied, and for restarting the count clock signal counting operation of the timer circuit when the reference data being held becomes non-identical with the predefined pattern or when the aforementioned another predefined condition becomes unsatisfied while the counting operation is being inhibited.

With this arrangement, the operation of the watchdog timer circuit is stopped only when the latest reference data that was externally imported with the timer refresh instruction being as a clock becomes consonant with the predefined pattern and, at the same time, the another predefined condition is met. As concordance of multiple bits is strictly required for the pattern matching, the watchdog timer circuit is hardly deactivated by error. Furthermore, when the watchdog timer circuit is deactivated as a result of unwanted concordance of the reference data with the predefined pattern due to the CPU's runaway or the like, it is possible to cause the watchdog timer circuit to quickly recover to its operable state without difficulty. This can be said because a state in which the latest reference data is different from the predefined pattern in at least one bit or more will easily appear due to the CPU's runaway or else.

(3) <Pattern Matching Circuit>

In Section 2, the timer control circuit has a shift register (SFTREG) of multiple bits (60-63), which latches the above-stated predetermined data signal while letting the timer refresh instruction be its latch timing, and a logic gate circuit (64) for inputting the multiple-bit latch data of the shift register as the reference data and for determining whether its input data is consonant with the above-stated predefined pattern.

With this arrangement, it is possible to achieve by a simplified circuit configuration the circuitry for pattern comparison with respect to the reference data.

(4) <EXOR>

In Section 2 or 3, when the predefined pattern is set to be a pattern which is not the same in every bit of the multiple bits, the timer control circuit further has a logic gate (65) for detecting that the predetermined data signal has the same logical value in a string of consecutive bits corresponding to the multiple bits and for generating a reset instruction.

With this arrangement, when assuming a refresh operation of the watchdog timer circuit which is different from the normal processing due to runaway or else, it is possible to cope with the microcomputer's abnormal refresh instruction-accompanied runaway in light of the fact that the predetermined data signal has a high degree of possibility for having the same logical value in succession due to such abnormality.

(5) <Power IC>

A power IC (1) in accordance with another embodiment of this invention has the watchdog timer circuit (40, 40A) as set forth in Section 2 and is formed on a semiconductor substrate. This power IC has a power supply circuit (10) which is operatively responsive to receipt of an external power supply voltage for generating a predetermined operation power supply voltage, and a reset circuit (50) which outputs an external reset signal (resb) in response to receipt of either a power-on reset instruction concerning the power supply voltage being output from the power supply circuit or the reset instruction (wdres) due to time-out of the timer circuit (30) of the watchdog timer circuit. The power IC further has a first external terminal (PRUN) for inputting from the outside of the power IC a control signal (prun) used for the timer refresh instruction, a second external terminal (RESB) for outputting the external reset signal (resb) to the outside of the power IC, and a third external terminal (STN) for inputting the data signal (stn) externally from the power IC. Furthermore, it has a fourth external terminal (VOUT) for outputting the predetermined operation power supply voltage (vout) to the outside of the power IC and a fifth external terminal (IG) for inputting other instructions from outside of the power IC.

With this arrangement, it is possible to realize a power IC capable of preventing the watchdog timer circuit from being deactivated accidentally and also capable of forcing, even when such erroneous deactivation occurs, the watchdog timer circuit to quickly recover to its operable state without difficulty.

(6) <Watchdog Monitor System>

A watchdog monitor system in accordance with still another embodiment has the power IC (1) as set forth in Section 5, a microcomputer (2) that is connected to first to fourth external terminals of the power IC, and a switch circuit (3) for outputting to the fifth external terminal a signal depending on a present switch state. The microcomputer executes a low power consumption command to thereby give the first external terminal (PRUN) a clock change corresponding to a bit number of the reference data, supplies the third external terminal (STN) with a data signal (stn) corresponding to the predefined pattern in sync with the clock change and thereafter goes into a low power consumption state. The timer control circuit (20) causes the timer circuit to stop its timer count operation on condition that an input (ig) to the fifth external terminal (IG) indicates that the switch circuit is presently in a switch-off state.

With this arrangement, the microcomputer supplies the predetermined data signal to the third external terminal in sync with a clock change being given to the first external terminal immediately prior to execution of the low power consumption command and; thereafter, the microcomputer is allowed to go into its low power consumption state. The watchdog timer circuit holds therein the reference data and is able to stop the timer count operation if it is ascertained that another condition(s) is/are met.

(7) <Restart of Timer Count Operation>

In Section 5, the timer control circuit restarts the timer count operation of the timer circuit when the input to the fifth external terminal changes from the turn-off state to turn-on state of the switch circuit or when the reference data becomes inconsonant with the predefined pattern after having supplied a data signal to the third external terminal in sync with a clock change that is given by the microcomputer to the first external terminal.

With this arrangement, it is possible to achieve monitoring or "surveillance" using the watchdog timer circuit owing to the microcomputer's recovery from the low power consumption state to normal state to thereby supply the data signal to the third external terminal in sync with the clock change being given to the first external terminal by itself. Achievement of the monitoring using the watchdog timer circuit is also enabled by turn-on of the switch circuit, which is manipulated without regard to the low power consumption state of the microcomputer.

(8) <Operation Power Supply Control in Standby and Sleep Modes>

In Section 7, the microcomputer has its low power consumption state which is either a first low power consumption state (i.e., sleep state) in which the feeding of the power supply voltage is stopped or a second low power consumption state (standby state) in which at least a central processing device is deactivated while maintaining the power supply voltage feeding. When going into the first low power consumption state, the microcomputer supplies a sixth external terminal of the power IC with a signal for instruction of supply stop of the operation power supply voltage. The power IC stops outputting of the operation power supply voltage on condition that there are both of an instruction for supply stop of the operation power supply voltage to the sixth external terminal (INH) and an instruction for supply stop of the operation power supply voltage to the fifth external terminal (IG), and restarts outputting of the operation power supply voltage in response to quittance of any one of these instructions.

With this arrangement, the switch circuit is turned off and, simultaneously, the microcomputer executes the low power consumption command to thereby interrupt the count-up operation of the timer counter of the watchdog timer circuit and, finally, instructs to stop the feeding of the operation power supply voltage, thereby causing the microcomputer to go into the first low power consumption state. When the switch circuit is turned on, the timer count-up operation of the timer counter of the watchdog timer circuit gets restarted. Accordingly, the watchdog timer circuit's monitoring functionality is guaranteed for the microcomputer whose second low power consumption state has been released due to the occurrence of a certain event. In addition, turn-on of the switch circuit permits restart feeding the operation power supply voltage to the microcomputer that has been set in the first low power consumption state, resulting in issuance of a power-on reset instruction, followed by operation startup of the microprocessor, for which the monitoring function of the watchdog timer circuit is guaranteed.

(9) <Communication Interface>

A watchdog monitor system in accordance with a further another embodiment has the power IC as set forth in Section 5, a microcomputer coupled to the first to fourth external terminals of the power IC, and a switch circuit for outputting to the fifth external terminal a signal depending on a present switch state. The power IC further has a communication interface circuit which is connected to a network bus (6) through network-side terminals (CANH, CANL) and which is coupled to the microcomputer via control-side terminals (MODE, TXD, RXD). The control-side terminals include an external communication terminal and an external mode terminal. The microcomputer executes a low power consumption command to thereby give the first external terminal a clock change corresponding to a bit number of the reference data and supplies the third external terminal with a data signal corresponding to the predefined pattern in sync with the clock change and then goes into a low power consumption state. Subsequently, the timer control circuit forces the timer circuit to stop its timer count operation on condition that an input to the fifth external terminal indicates that the switch circuit is in a switch-off state and, simultaneously, an input to the mode terminal is a standby instruction with respect to the communication interface circuit.

With this arrangement, the microcomputer supplies the predetermined data signal to the third external terminal in sync with a clock change being given to the first external terminal immediately before execution of the low power consumption command; after that, it goes into the low power consumption state. The watchdog timer circuit holds the reference data and is able to stop the timer count operation after having ascertained establishment of the instructions of turn-of of the switch circuit and standby of the communication interface circuit as the above-stated another condition.

(10) <Restart of Timer Count Operation>

In Section 9, the timer control circuit restarts the timer count operation of the timer circuit when the input to the fifth external terminal changes from the turn-off state to turn-on state of the switch circuit or when the input to the mode terminal changes to an activation instruction with respect to the communication interface circuit or when the reference data becomes inconsonant with the predefined pattern after having supplied a data signal to the third external terminal in sync with a clock change as given by the microcomputer to the first external terminal or, alternatively, when the input signal of the external communication terminal changes resulting in it becoming the cause of recovery of the microcomputer.

The same functionality and advantages as those set forth in Section 7 are obtained.

(11) <Automotive ECU, Ignition Switch>

In Section 10, the communication interface is an in-vehicle network, the microcomputer makes up an electronic control unit (ECU) for use in motor vehicles, and the switch circuit is an ignition switch.

With this arrangement, it is possible to contribute to both of an improvement in reliability of the watchdog monitoring function of the microcomputer in the automotive ECU being linked to the in-vehicle network and a decrease in power consumption of the microcomputer.

(12) <Operation Power Supply Voltage Control in Standby and Sleep Modes>

In Section 11, the microcomputer's low power consumption state is either a first low power consumption state in which the feeding of the power supply voltage is stopped or a second low power consumption state in which at least a central processing device is rendered inactive while maintaining the power supply voltage feeding. When going into the first low power consumption state, the microcomputer supplies the power IC's sixth external terminal with a signal for instructing supply stop of the operation power supply voltage. The power IC stops outputting the operation power supply voltage on condition that there is an instruction for stopping the feeding of the operation power supply voltage to the sixth external terminal and, simultaneously, an off-state signal of the switch circuit is input to the fifth external terminal, and restarts outputting the operation power supply voltage in response to quittance of either one of these instructions.

With this arrangement, the same function and advantages as those set forth in Section 8 are obtained.

(13) <Watchdog Monitor System of Another Viewpoint Corresponding to Section 6>

A watchdog monitor system in accordance with still another further embodiment has a power IC, a microcomputer coupled to the power IC, and a switch circuit for outputting to the power IC a signal depending on a switch state. The power IC includes a watchdog timer circuit, a power supply circuit for receiving an external power supply voltage and for generating a predetermined operation power supply voltage, and a reset circuit for outputting an external reset signal in response to receipt of either a power-on reset instruction relating to the power supply voltage to be output from the power supply circuit or a reset instruction to be output from the watchdog timer circuit. The watchdog timer circuit includes a timer circuit for counting a count clock signal from its initial value to provide a count value, which is initialized based on a timer refresh instruction to be externally input thereto, and for outputting the reset instruction when the count value reaches a timeout value. The watchdog timer circuit further includes a timer control circuit for loading a predetermined data signal as externally input thereto in sync with the timer refresh instruction, for holding therein the sequentially loaded latest multi-bit data signal as reference data, for inhibiting a count clock signal counting operation performed by the timer circuit when the retained reference data is consonant with a predefined pattern and also satisfies another prespecified condition, and for restarting the count clock signal counting operation of the timer circuit when the retained reference data becomes inconsonant with the predefined pattern or when the aforesaid another prespecified condition fails to be met while the counting operation is being inhibited. Immediately prior to execution of the low power consumption command, the microcomputer gives the power IC a clock change corresponding to a bit number of the reference data by means of the timer refresh instruction and supplies a data signal corresponding to the predefined pattern in sync with such the clock change and then goes into a low power consumption state.

With this arrangement, the operation of the watchdog timer circuit is stopped only when the latest reference data that was externally imported with the timer refresh instruction being as a clock becomes consonant with the predefined pattern and, at the same time, the another predefined condition is met. Since the pattern matching does require concordance of multiple bits, the watchdog timer circuit is hardly deactivated by error. Furthermore, when the watchdog timer circuit is deactivated as a result of accidental concordance of the reference data with the predefined pattern due to the CPU's runaway or the like, it is possible to cause the watchdog timer circuit to quickly recover to its operable state without difficulty. This can be said because a state in which the latest reference data is different from the predefined pattern in at least one bit or more will easily take place due to the CPU's runaway or else. In addition, the microcomputer is allowed to go into its low power consumption state after having executed the low power consumption command to thereby supply the required data signal in sync with the refresh instruction whereas the watchdog timer circuit holds therein the reference data and is able to stop the timer count operation after having verified establishment of another condition(s).

(14) <EXOR>

In Section 13, the microcomputer outputs as the predetermined data signal a signal which does not become the same in every bit of the multiple bits. The timer control circuit gives the reset circuit the reset instruction when it is detected that the predetermined data signal has the same logical value with respect to a successive string of the multiple bits.

With this arrangement, the same function and advantages as those set forth in Section 4 are obtained.

(15) <Reset-Driven MCU Outputs Data Signal in Sync with Timer Refresh Instruction>

In Section 14, the microcomputer is reset in response to receipt of an external reset signal to be output from the reset circuit, thereby to start outputting of the data signal in sync with the timer refresh instruction.

With such arrangement, it is possible to activate the monitoring function against abnormalities of the timer refresh instruction from a time point immediately after the reset release.

(16) <Watchdog Monitor System of Another Viewpoint Corresponding to Section 9>

A watchdog monitor system in accordance with a still another further embodiment has a power IC, a microcomputer coupled to the power IC, and a switch circuit for outputting a signal depending on a switch state to the power IC. The power IC includes a watchdog timer circuit, a power supply circuit for receiving an external power supply voltage and for generating a predetermined operation power supply voltage, a reset circuit for outputting an external reset signal in response to receipt of either a power-on reset instruction concerning the power supply voltage to be output from the power supply circuit or a reset instruction to be output from the watchdog timer circuit, and a communication interface circuit coupled to the microcomputer and to a network bus. The watchdog timer circuit has a timer circuit for counting a count clock signal from its initial value to provide a count value, which is initialized based on a timer refresh instruction to be externally input thereto, and for outputting the reset instruction when the count value reaches a timeout value. The watchdog timer circuit further includes a timer control circuit for importing a predetermined data signal as externally input thereto in sync with the timer refresh instruction, for holding therein the sequentially loaded latest multi-bit data signal as reference data, for inhibiting a count clock signal counting operation performed by the timer circuit while conditioning that the reference data being held is consonant with a predefined pattern, that an operation mode instruction with respect to the communication interface circuit is a standby instruction and that a switch state of the switch circuit indicates turn-off, and for restarting the count clock signal counting operation of the timer circuit on condition that the reference data being held becomes inconsonant with the predefined pattern, that the operation mode instruction relative to the communication interface circuit is changed to an activation instruction, that startup of external communication of the communication interface circuit is detected or that the switch state of the switch circuit is changed to turn-on while the counting operation is being inhibited. The microcomputer executes the low power consumption command to thereby give the power IC a clock change corresponding to a bit number of the reference data by means of the timer refresh instruction and supplies a data signal corresponding to the predefined pattern in sync with such clock change and then goes into a low power consumption state.

With this arrangement, the operation of the watchdog timer circuit is stopped only when the latest reference data that was externally imported with the timer refresh instruction being as a clock becomes consonant with the predefined pattern and simultaneously the another predefined condition is satisfied. As the pattern matching requires concordance of multiple bits, the watchdog timer circuit is hardly deactivated accidentally. Furthermore, when the watchdog timer circuit is made inactive as a result of accidental concordance of the reference data with the predefined pattern due to the CPU's runaway or else, it is possible to cause the watchdog timer circuit to quickly recover to its operable state without difficulty, because a state in which the latest reference data differs from the predefined pattern in at least one bit or more will readily appear due to the CPU's runaway or else. In addition, the microcomputer is allowed to go into its low power consumption state after having executed the low power consumption command to thereby supply the required data signal in sync with the refresh instruction whereas the watchdog timer circuit holds therein the reference data and is able to stop the timer count operation after having verified establishment of other conditions—i.e., turnoff of the switch circuit and standby instruction of the communication interface circuit.

(17) <EXOR>

In Section 16, the microcomputer outputs as the predetermined data signal a signal which does not become the same in every bit of the multiple bits. The timer control circuit gives the reset circuit the reset instruction when detecting that the predetermined data signal has the same logical value in a successive string of the multiple bits.

With such arrangement, the same function and advantages as those set forth in Section 4 are obtained.

(18) <Reset-Driven MCU Outputs Data Signal in Sync with Timer Refresh Instruction>

In Section 17, the microcomputer is reset in response to an external reset signal to be output from the reset circuit and then starts outputting the data signal in sync with the timer refresh instruction.

With this arrangement, the same function and advantages as those set forth in Section 15 are obtained.

2. Details of Embodiments

A further detailed explanation will be given of illustrative embodiments.

<1. Watchdog Monitor System>

Referring now to FIG. 1, there is depicted one exemplary watchdog monitor system. The watchdog monitor system as shown herein is adaptable for use in an electronic control unit (ECU) of body system built in motor vehicles although the invention should not exclusively be limited thereto. For example, the system is also used for door lock/unlock control, power window open/close control, light turn-on/off control, door mirror direction adjustment, etc. Although built-in microcomputers of body-system ECUs include a one arranged to go into a low power consumption state during car engine stop to thereby suppress battery use-up, this type of body-system ECU is especially required to recover to its active state from the low power consumption state and starts providing control in quick response to receipt of an instruction, such as a door open/close instruction, even in cases where the engine is stopped due to turn-off of ignition switch. In such microcomputer systems under strict requirement for higher reliability, a watchdog timer circuit that is externally coupled to a microcomputer is used in order to rapidly detect and avoid a malfunction occurring due to the microcomputer's runaway or else. It is the microcomputer that is expected to periodically initialize a timer count value of the watchdog timer circuit. As long as the timer count operation of watchdog timer circuit remains continued, it is a must for the microcomputer, even in its low power consumption state, to temporarily transit from the low power consumption state to a normal operation power state in a periodical manner to thereby perform the timer initialization operation. Since the microcomputer does not perform any command execution in the low power consumption state, substantive monitoring to be performed by the watchdog timer circuit is less in significance—in addition, nonnegligible power consumption is needed to make the microcomputer periodically recover to its operable state from the low power consumption state. Although a watchdog monitor system as will be described below is the one that interrupts the timer count operation of the watchdog timer circuit in the microcomputer's low power consumption state in order to lower such power consumption, this system is specifically arranged to avoid deterioration of the reliability of the watchdog monitor system in operation-stop and release events thereof. More specifically, this system is capable of controlling activation and deactivation of the watchdog timer circuit to thereby ensure that the watchdog timer circuit is hardly rendered inoperative accidentally and is also able to make the watchdog timer circuit recover to its operable state quickly and easily even when the circuit is deactivated accidentally. Details of it will be set forth below.

The watchdog monitor system shown in FIG. 1 has a power IC (PWIC) 1, a microcomputer (MCU) 2 connected to the power IC 1, and a switch circuit, e.g., an ignition switch 3, which outputs to the power IC a signal indicative of a switch state.

The ignition switch 3 is a switch for instructing start-up of a motor vehicle. Although not specifically illustrated in FIG. 1, a signal generated by turn-on of the ignition switch 3 is used as a trigger for the engine start by way of a power train-system ECU of the vehicle. A signal generated by turn-off of the ignition switch 3 is used as a trigger for engine stop via the power train-system ECU.

An ignition switch signal "ig" responsive to turn-on and turn-off of the ignition switch 3 is input from an ignition terminal (fifth external terminal) IG.

The power IC 1 has a power supply circuit (RGLT) 10, a watchdog reset circuit (WDRST) 11, and a communication interface circuit (TRSCV) 12.

The power supply circuit 10 receives at an external power supply input terminal VS an external power supply voltage "vs" from a battery power source 4 or the like and generates a predetermined operation power supply voltage "vout," which is output from a power supply terminal (fourth external terminal) VOUT. The power supply circuit 10 is made up of a DC-DC series regulator, for example. Supplied to this power supply circuit 10 are the above-stated ignition signal ig for power supply control and a power supply control signal inh which is input to a power supply control terminal (sixth external terminal) INH from the microcomputer 2 for power supply control. An external ground terminal GND is for reception of a ground voltage gnd. Note here that an operation power supply of the power IC per se is either an external power supply voltage vs or an internal voltage (not depicted) to be generated by the power supply circuit 10, for example.

The communication interface circuit 12 is constituted, for example, from a controller area network (CAN) transceiver. The communication interface circuit 12 is connected on its one side to network-side terminals CANH and CANL and coupled on the other side to control-side terminals, such as a mode terminal MODE, transmission terminal Txd and reception terminal Rxd. The network-side terminals CANH and CANL are coupled to a network bus 6. The mode terminal MODE, transmission terminal Txd and reception terminal Rxd are connected to a CAN controller embedded in the microcomputer. This CAN controller performs CAN protocol control, including but not limited to the creation of communication frames, communication arbitration and error handling. The communication interface circuit 12 performs generation and adjustment of signals transmitted to the network bus. The mode terminal MODE is such that a mode signal mode for use in activation/deactivation control of the communication interface circuit 12 is supplied thereto from the microcomputer 2. A transmission signal txd is supplied to the transmission terminal TXD from the microcomputer 2; reception data rxd is output from the reception terminal RXD to microcomputer 2.

The watchdog reset circuit 11 is a circuit block that realizes a reset function concerning the power supply voltage vout to be generated by the power supply circuit 10 and watchdog monitor function for monitoring a present state of the microcomputer 2. The reset function is for outputting an external reset signal resb from external reset terminal (second external terminal) RESB in response to receipt of a power-on reset instruction, a low voltage reset instruction, a watchdog reset instruction or the like. The power-on reset instruction is generated upon detection of an event that the power supply voltage vout has reached an operation guarantee voltage from the ground voltage. The low-voltage reset instruction is generated by detecting that the power supply voltage is lowered in potential after power-on reset. The watchdog monitor function is for inhibiting generation of the watchdog reset instruction by repeated execution of a timer count value initialization operation every time a refresh signal prun being given from the microcomputer 2 to a refresh terminal (first external terminal) PRUN is made active periodically and for generating the watchdog reset instruction when the timer count value fails to be reset until the timeout occurs.

The microcomputer 2 has a central processing unit (CPU) 2A which executes commands in accordance with a software program. While such command execution is being properly performed by the CPU 2A, the refresh signal prun is periodically made active at prespecified time intervals in accordance with the program. In the CPU 2A's runaway state, abnormality takes place: the refresh signal prun completely fails to be activated; adversely, this signal is activated on an excessive number of occasions. The microcomputer 2 has power supply voltage states, including a first low power consumption state, i.e., sleep state in which the supplying of clocks to the CPU is stopped, and a second low power consumption state, i.e., standby state in which at least the CPU 2A's command execution operation is aborted while maintaining the feeding of the power supply voltage vout.

In the low power consumption states, the CPU 2A does not execute any command; so, it is impossible to activate the refresh signal prun.

The watchdog reset circuit 11 has a function to control stop and restart of the timer count operation in a way pursuant to the state of an input from external terminal(s), by taking account of the microcomputer 2's low power consumption state. More precisely, the circuit serially loads and holds therein a data signal stn from data input terminal (third external terminal) STN in sync with a timer refresh instruction (e.g., a rise-up change of refresh signal prun) to be given from the refresh terminal PRUN and sets as a necessary condition for the halt of timer count operation a state in which the reference data—i.e., latest multiple-bit data signal being held therein—is consonant with a predefined pattern. The watchdog reset circuit 11 uses the timer fresh signal prun as a timer refresh instruction signal and uses it as a data latch enable signal to latch data being supplied to the data signal stn. In addition, the circuit sets as a sufficient condition for restart of timer count operation a state in which the above-stated consonant state is changed due to the loading or "import" of a data signal stn from the data input terminal STN in sync with a subsequent timer refresh instruction.

One exemplary way of satisfying the necessary condition of timer count operation halt is as follows: in cases where the microcomputer 2 executes the low power consumption command and goes into its low power consumption state, the microcomputer 2 serially outputs, as part of a session for such command execution, the data signal stn consonant with the predefined pattern to the data input terminal STN in sync with a rising change of the refresh signal prun. An exemplary way of meeting the sufficient condition of the timer count operation restart is as follows: when the low power consumption state is released by occurrence of an interruption or else, the microcomputer 2 first forces the refresh signal prun to exhibit a rise-up change and, in sync therewith, outputs a data signal stn of a single bit to the data input terminal STN. With this processing, the reference data being held by the watchdog reset circuit 11 becomes inconsonant with the predefined pattern.

There may be other necessary conditions, each of which is usable as the necessary condition for halt of the timer count operation. In this embodiment, one of them is a notice of the ignition switch 3's turn-off state by means of an ignition switch signal ig. In the embodiment having the communication interface circuit 12, there is a notice of a communication sleep state indicating that the communication interface circuit 12 is in its sleep state, although this invention is not exclusively limited thereto. Regarding the sufficient condition of the timer count operation restart, there may be other sufficient conditions. In this embodiment, there are a notice of the ignition switch 3's turn-on by means of the ignition switch signal ig and a notice of releasing the communication sleep state although the invention is not exclusively limited thereto. The communication sleep state is notified by a high level of a CAN enable signal canena to be output from the communication interface circuit 12; the release thereof is notified by a low level of CAN enable signal canena although this is not to be construed as limiting the invention.

With the timer count operation stop/restart control of the watchdog reset circuit 11 based on the above-stated necessary and sufficient conditions, the watchdog timer circuit is no longer rendered inoperative accidentally because the consonance of a pattern for stopping the timer count operation does require congruence of two or more bits at a time. Furthermore, even when the timer count operation is stopped erroneously due to accidental congruence of the reference data with the predefined pattern due to the microcomputer 2's runaway or the like, a state is expected to appear soon afterward in which the retained reference data changes in at least one bit in case the operation failure, such as the runaway of microcomputer 2, remains uncured continuously. Thus, it is possible to force the accidentally interrupted timer count operation to quickly recover to its operable state without difficulty. In short, the embodiment circuit has its advantage in that the timer count operation of the watchdog reset circuit 11 is hardly stopped by error and that the circuit is rapidly recoverable to its operable state even upon occurrence of such erroneous operation stop. Additionally, when compared to an approach for separately providing a data latch enable terminal and for supplying the reference data thereto, it becomes easier, by performing data latch of the data signal stn along with a timer refresh operation using the timer refresh signal prun which makes it easier to presumably recognize that the microcomputer 2 is normally operating, to deter the timer count operation interruption due to the appearance of an unforeseen accidental signal state during runaway of the microcomputer 2.

Particularly but not exclusively, the watchdog reset circuit 11 has per se a debug enable terminal WDTE that makes it possible to control the stop and restart of the timer count operation in order to achieve, in addition to the above-stated timer count operation stop/restart control, the convenience that eliminates the need for a process of refreshing the timer count operation during system debugging and/or when writing a program into an on-chip flash memory of the microcomputer 2 by way of example. Here, the debug enable terminal WDTE is set to a high level whereby the timer count operation is stopped. In debug-completed product systems, the debug enable terminal WDTE may be potentially pulled down to the ground voltage gnd. Such the pull-down manipulation is pictorially represented by a switch in FIG. 1.

<2. Watchdog Timer Circuit>

Figure 2:
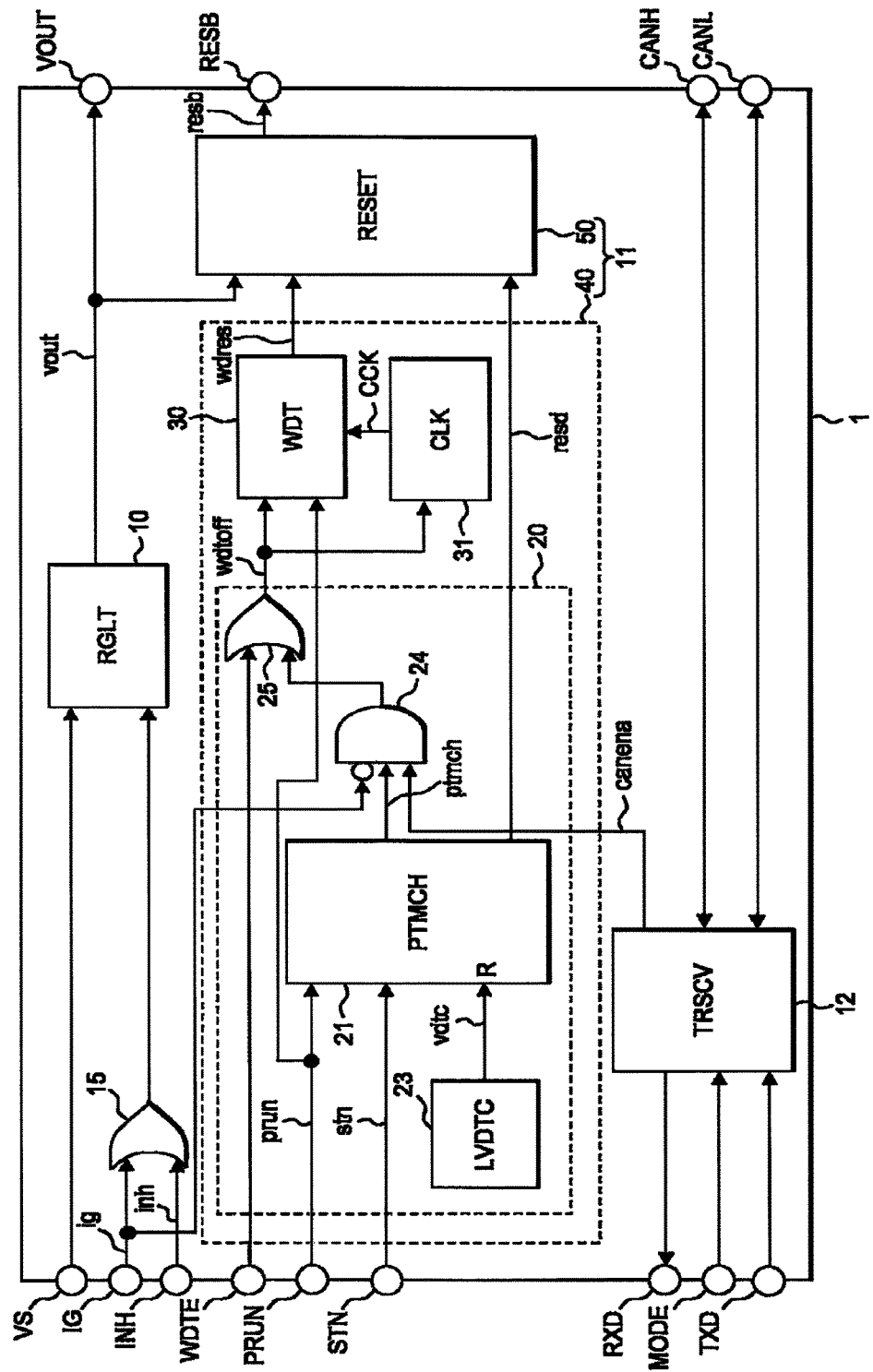
FIG. 2 is a block diagram showing an exemplary configuration of a power IC included in the watchdog monitor system of FIG. 1.

Turning to FIG. 2, a practical example of the watchdog reset circuit 11 is shown. The watchdog reset circuit 11 has a watchdog timer circuit 40 and a reset circuit 50.

The reset circuit 50 is for generating the aforementioned power-on reset instruction upon detection of input of the power supply voltage vout, for inputting from the watchdog timer circuit 40 a watchdog reset instruction signal wdres which gives the watchdog reset instruction, and for inputting a reset instruction signal resd responsive to a low-voltage reset instruction or the like. The reset circuit 50 is responsive to receipt of the power-on reset instruction or the watchdog reset instruction or the low-voltage reset instruction, for outputting a reset signal resb of low level from the reset terminal RESB and, thereafter, inverting it to high level to thereby give a reset release instruction.

The watchdog timer circuit 40 has a timer circuit (WDT) 30, clock generation circuit (CCKG) 31 and timer control circuit (WDTCONT) 20, although the invention should not exclusively be limited thereto.

The clock generator circuit 31 generates a count clock signal CCK. The timer circuit 30 performs a count operation in sync with the count clock signal CCK. A count value of it is arranged to range from its initial value up to a timeout value. The timeout value may be a fixed value or, alternatively, a register value to be programmably set by the microcomputer 2 although the invention is not exclusively limited thereto. The count value (timer count value) is initialized by the timer circuit 30 in sync with a rising change of the refresh signal prun although the invention is not limited thereto. The count operation in sync with the count clock signal CCK is continued as long as the initialization operation responding to the refresh signal prun is inserted before the timer count value of the timer circuit 30 reaches the timeout value. When the timer count value reaches the timeout value, the timer circuit 30 activates the watchdog reset signal wdres and gives it to the reset circuit 50 in order to perform the above-stated watchdog reset instruction.

The stop and start of the timer count operation in the timer circuit 30 are performed, for example, in response to abortion and generation of the count clock signal CCK in the clock generator circuit 31, respectively. An example is that the count clock signal CCK is stopped by a potential change of timer-off signal wdtoff to high level whereas the count clock signal CCK is generated by a change of the signal to low level. Here, an uprising change to high level of the timer-off signal wdtoff is also supplied to the timer circuit 30 so that the timer count value initialization in the timer circuit 30 is performed in response to such high-level change also, although the invention is not limited thereto. Accordingly, when the count clock signal CCK is stopped, the timer count value of timer circuit 30 is set to its initial value, thereby enabling restart of the timer count operation from the initial value.

The timer control circuit 20 has a pattern matching circuit (PTMCH) 21, low-voltage detection circuit (LVDTC) 23, AND gate 24 and OR gate 25.

The low-voltage detector circuit 23 operates, although not specifically limited thereto, to determine whether the power supply voltage vout is higher in potential than the operation guarantee voltage after power-on reset. When the supply voltage is higher in potential than or equal to the operation guarantee voltage, the circuit outputs a detection signal vdtc of high level; when the former is lower than the latter, it makes the detection signal vdtc change to low level.

The pattern matching circuit 21 sequentially receives and takes thereinto a data signal stn from the data terminal STN with the refresh signal prun being as a clock therefor, holds therein a predetermined number of latest bits as reference data, determines whether its holding reference data is consonant with a predefined pattern, and outputs a pattern discrimination signal ptmch that reflects such determination result.

Figure 3:
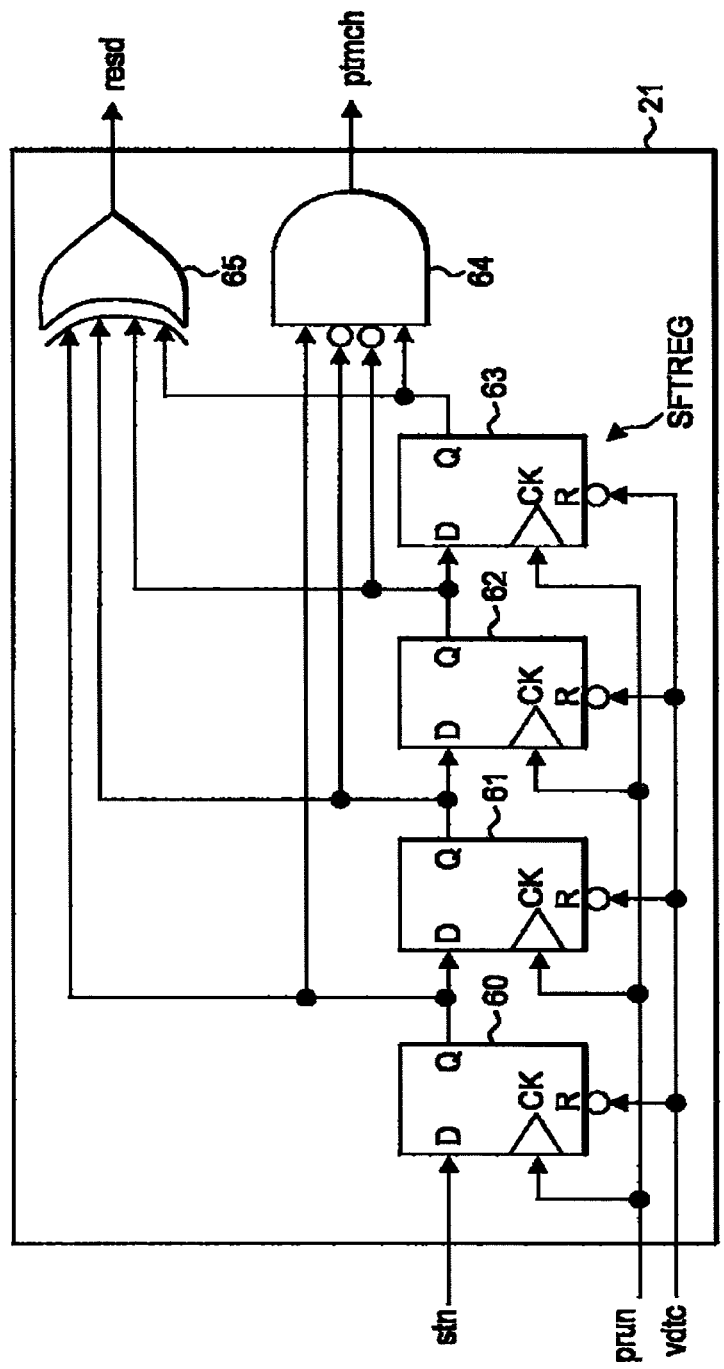
FIG. 3 is a logic circuit diagram showing one example of a pattern matching circuit included in the power IC of FIG. 2.

A practical example of the pattern matching circuit 21 is shown in FIG. 3. This circuit has a shift register (SFTREG) that is made up of a series combination of four stages of D-type flip-flops 60 to 63 with a data output node Q of a pre-stage being coupled to a data input node D of its post stage. The data signal stn is supplied to a data input node D of the prime stage. The refresh signal prun is supplied to a clock node CK in a parallel way. The detection signal vdtc is fed to a reset node R. A respective bit of the latest 4-bit reference data being held by the shift register is subjected to logical multiplication by 4-input AND gate 64 in a state with a string of non-inversion, inversion, inversion and noninversion, thereby determining whether the latest reference data is consonant with a predefined pattern "1001." If the former is identical to the latter, the pattern match signal ptmch is set to high level; otherwise, it is set to low level.

Each bit value of the flip-flops 60-63 is subjected to concordance/discordance discrimination in a parallel manner, by an Exclusive-OR gate (EXOR) 65 functioning as a concordance judging circuit. Upon concordance, a reset instruction is given to the reset circuit 50 by means of a reset instruction signal resd. The reset instruction using the reset instruction signal resd is a low-voltage reset instruction or a reset instruction due to pattern abnormality. The low-level reset instruction is generated in response to occurrence of an event that a detection signal vdtc is set to low level by low-voltage detection of the low-voltage detector circuit 23 to thereby set all of the values of the series-connected four stages of D flip-flops 60-63 at logical value "0." The pattern abnormality-triggered reset instruction is generated by occurrence of an event which follows: even in cases where the refresh signal prun experiences a clock change with an abnormally shortened cycle due to the runaway of CPU 2A, for example, and this results in lack of the ability to generate the watchdog reset instruction, respective bit values of flip-flops 60-63 are kept to have the same logical value if the microcomputer 2's function of outputting the data signal stn is also lost.

The AND gate 24 applies logical multiplication to its three input signals—here, the pattern match signal ptmch, CAN enable signal canena and ignition signal ig. Its logical product signal is subject to logical sum processing with an input signal from the debug enable terminal WDTE, resulting in creation of the watchdog off signal wdtoff stated supra.

In accordance with this embodiment, the condition for halt of the count clock signal CCK of the timer circuit 30 is such that the data being latched in D flip-flops 60-63 in sync with the activation timing of refresh signal prun is set to high level of the pattern match signal ptmch that is output in responding to the state of holding the reference data "1001." Additionally, the timer count operation of the watchdog timer circuit is interrupted by simultaneous establishment of the low level of ignition signal ig responsive to turn-off of the ignition switch 3 and the high level of CAN enable signal canena responding to the communication sleep state of the communication interface circuit 12.

To restart the once-stopped timer count operation, what is required is that at least one of the above-stated conditions becomes unsatisfied. More specifically, the operation gets restarted when the ignition switch 3 is turned on, when the communication interface circuit 12 is waked up or when a change of the reference data "1001" occurs.

Figure 4:
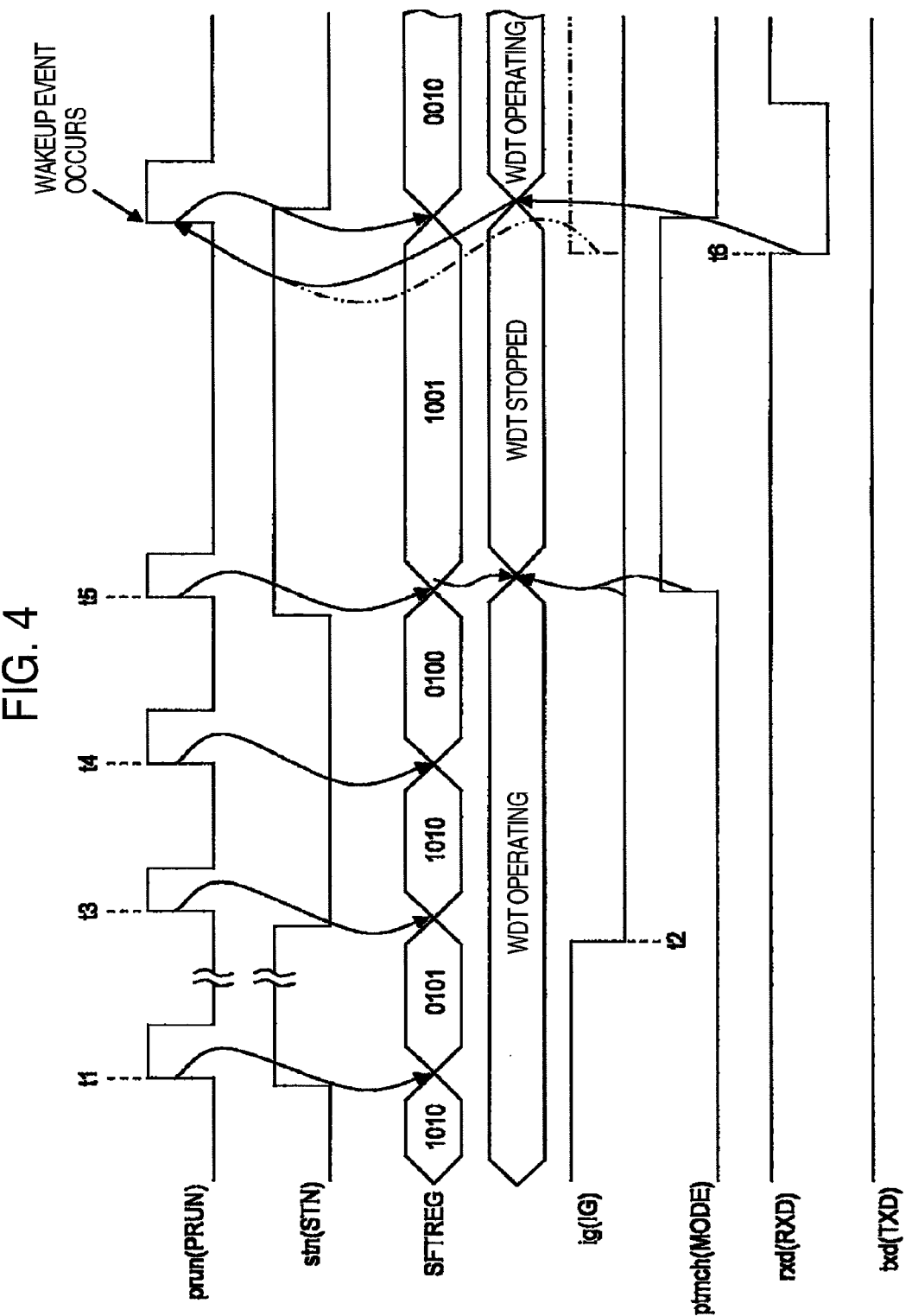
FIG. 4 is a timing chart exemplarily showing operation interruption and restart timings of a watchdog timer circuit.

FIG. 4 shows exemplary operation-stop/restart timings of the watchdog timer circuit 40.

Here, the microcomputer 2 alternately outputs during its normal operation a logical value "1" and logical value "0" to the data terminal STN in sync with pulse changes of the refresh signal prun transmitted to refresh terminal PRUN. For example, when the value of the shift register SFTREG is "1010," a change to "0101" occurs at time point t1. Note here that the value representation of the shift register SFTREG is defined to correspond to the order of D flip-flops 63, 62, 61 and 60.

At time point t2, the ignition switch 3 is turned off. In responding thereto, the microcomputer 2 executes a standby command. This command execution of microcomputer 2 includes a process of forcing the refresh signal prun to change in clock so that the data signal stn is set to "0" at time point t3, to "0" at time point t4 and to "1" at time point t5, thereby holding the latched reference data "1001" in shift register SFTREG. Whereby, the pattern match signal ptmch is set at high level. Concurrently with this, the ignition signal ig is set to low level due to turnoff of the ignition switch 3, and the CAN enable signal canena is set at high level due to communication sleep of the communication interface circuit 12. This meets the necessary condition of the timer count operation halt of the watchdog timer circuit. Thus, the watchdog timer circuit is deactivated. In the standby state of microcomputer 2, the timer count operation of watchdog timer circuit 40 is halted. During this session, the watchdog reset instruction is prevented from being generated. It is thus possible to suppress wasteful consumption of electric power which is to be used in events that the microcomputer 2 being set in its standby state recovers from the standby state in order to initialize the timer count value of watchdog timer circuit 40 periodically.

When at time point t6 the communication interface circuit 12 experiences signal transmission thereto, the communication interface circuit 12 wakes up for data reception. In responding thereto, the CAN enable signal canena is changed to low level whereby one necessary condition for interruption of the timer count operation of watchdog timer circuit 40 fails to be satisfied so that the timer count operation of this watchdog timer circuit gets restarted.

Simultaneously, in response to the wake-up of communication interface circuit 12 (i.e., wakeup event), the CPU 2A recovers to its operable state from standby state and outputs a data signal stn of logical value "0" in sync with the refresh signal prun, thereby causing the reference data to change to "0010." The CPU 2A, which has now returned to its normally operable state, operates in accordance with its operation program to continue the operation of outputting the data signal stn by making the refresh signal prun to exhibit a pulse change(s) prior to timeout of the watchdog timer circuit 40.

The restart of the timer count operation of watchdog timer circuit 40 is also enabled by an event that the ignition signal ig changes to high level in response to turn-on of the ignition switch 3 as indicated by a two-dot chain line in FIG. 4.

Additionally, in a case where the microcomputer 2 executes the sleep command when the ignition switch 3 is turned off at time point t2, the microcomputer 2 performs an operation in addition to the processing as has been stated in the case of standby command execution—i.e., it finally outputs a low-level power supply signal inh to the control terminal INH. In response to receipt of this signal, the power IC 1 stops generation of the power supply voltage vout by the power supply circuit 10 in response to a logical sum signal having low level to be output from the OR gate 15 as a result of the signals ig and inh being set to low level. By this, the feeding of the power supply voltage to the microcomputer 2 is stopped; so, the microcomputer 2 goes into its sleep state. Thereafter, the ignition switch 3 is turned on, causing the logical sum signal of OR gate 15 to potentially change to high level. Thus, the voltage generation operation of the power supply circuit 10 gets restarted whereby the feeding of the operation power supply voltage to microcomputer 2 is restarted and, simultaneously, the reset circuit 50 instructs microcomputer 2 to execute the reset processing by sending thereto the reset signal resb. After the reset release, the microcomputer 2 is rendered operative. Concurrently with this operation, the watchdog timer circuit 40 also restarts the timer count operation; thus, the watchdog monitor operation is enabled. Other operations are similar to those in the case of the microcomputer 2 executing the standby command.

Figure 5:
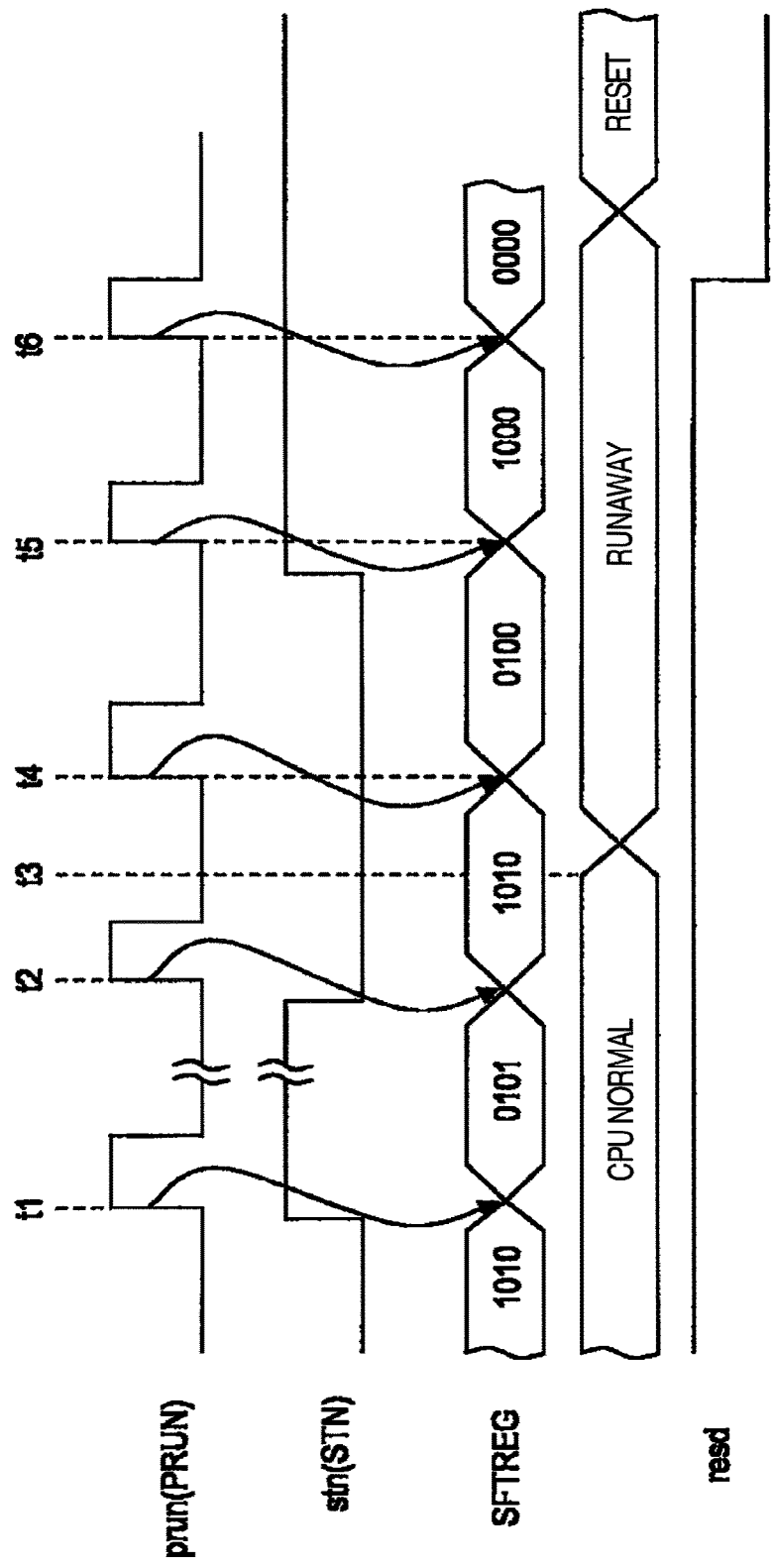
FIG. 5 is a timing chart exemplarily showing an operation for generation of a reset instruction signal "resd" in a runaway state of CPU.

See FIG. 5, which shows examples of generation operation timings of the reset instruction signal resd in the runaway state of CPU 2A.

Here, the microcomputer 2 outputs during its normal operation a logical value "1" and logical value "0" alternately to the data terminal STN in sync with pulse changes of the fresh signal prun being sent to refresh terminal PRUN. For example, when the value of the shift register SFTREG is "1010," a change to "0101" occurs at time point t1. The value representation of shift register SFTREG is the same as that in the case of FIG. 4. Similarly at time point t2, the data signal stn is set to logical value "1," resulting in the value of shift register SFTREG being set to "0101."

In this example, it is assumed that runaway of CPU 2A takes place at time point t3. Suppose that in such CPU 2A's runaway state, the refresh signal prun undergoes clock changes with a short cycle. It is considered that in the CPU 2A's runaway state, the operation of changing the data signal to logical level "1" and "0" alternately is no longer properly maintained; even in such case, the data signal stn is very likely to remain fixed to "0" or "1." Here, it is presupposed that the data signal stn is fixed to "0" whereas the value of shift register SFTREG is set to "0100" at time point t4, to "1000" at time t5, and to "0000" at time t6. When the value of shift register SFTREG is set to "0000," the reset instruction signal resd potentially goes low; then, the microcomputer 2 is reset by external reset signal resb. Thus, the CPU 2A's runaway is cured.

<3. Another Example of Watchdog Timer Circuit>

Figure 6:
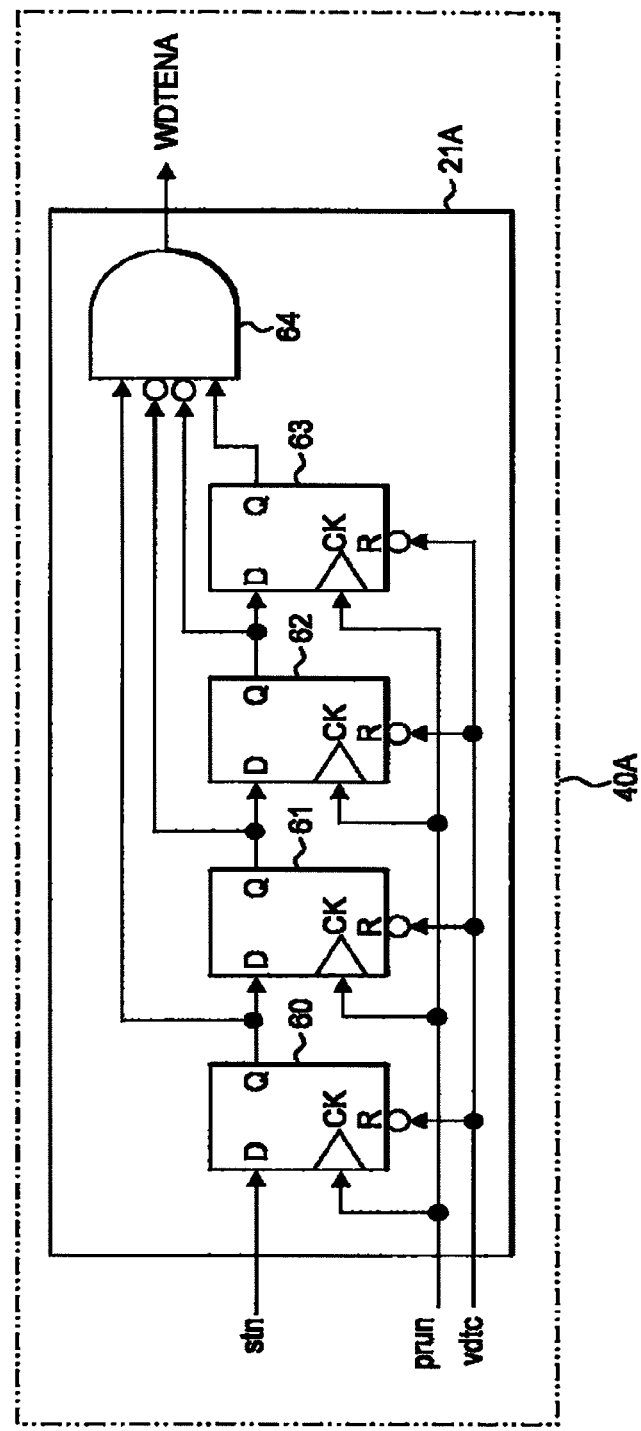
FIG. 6 is a block diagram showing another example of the pattern matching circuit.

Turning to FIG. 6, another example of the watchdog timer circuit 40A is depicted. The watchdog timer circuit 40A shown herein is different from that of FIG. 3 in configuration of the pattern matching circuit. FIG. 6 shows only such different pattern matching circuit 21A for brevity purposes: the other arrangements are the same as those shown in FIG. 2 so that these are eliminated from illustration. The pattern matching circuit 21A differs from the pattern matching circuit 21 of FIG. 3 in that the function of generating the reset signal resd is omitted: the former is the same as the latter in other arrangements. As a consequence of this design, any reset signal is not generated in the event of zero-clear of latch data with respect to the flip-flops 60-63.

Figure 7:
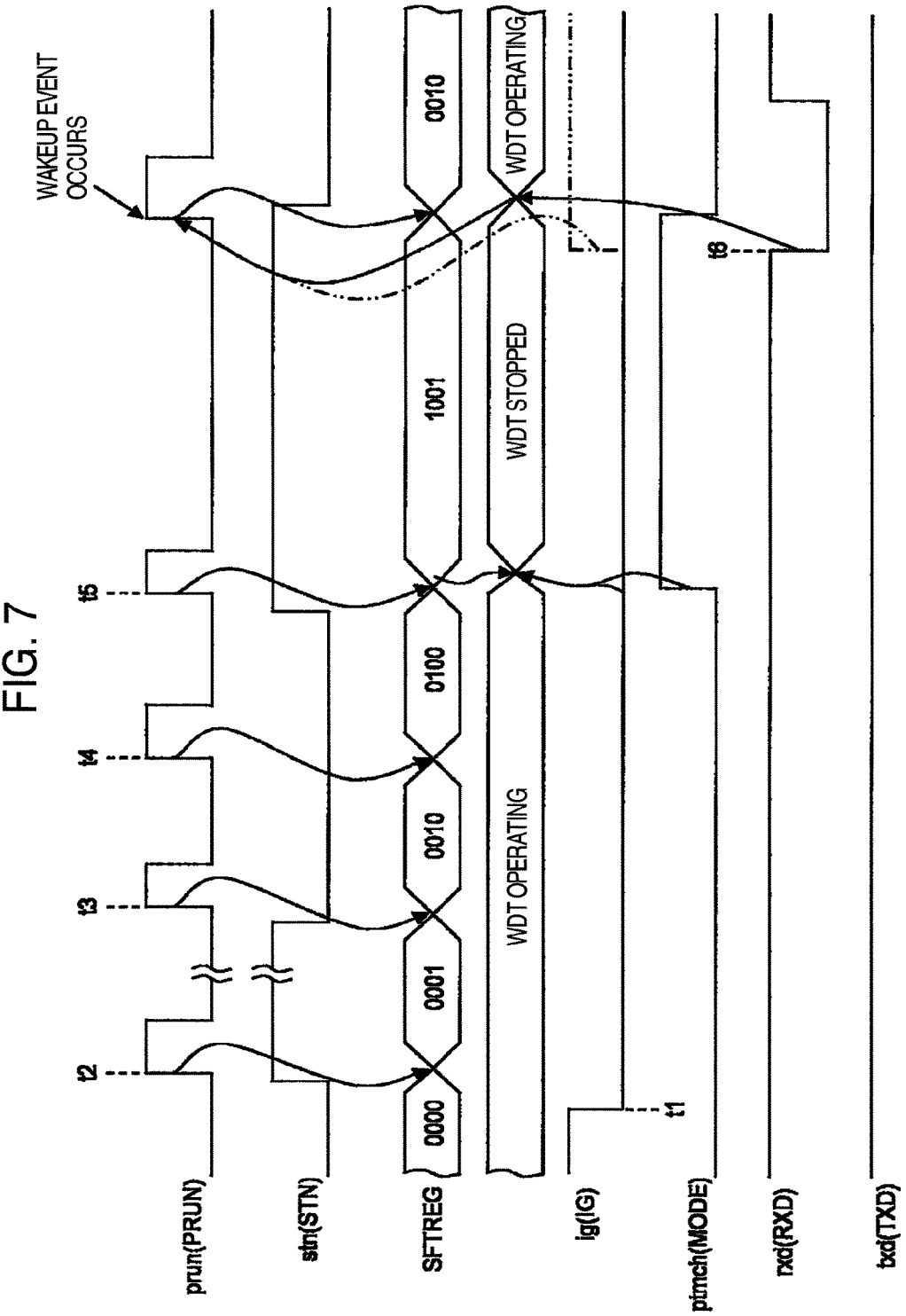
FIG. 7 is a timing chart exemplifying deactivation and restart operation timings of a watchdog timer circuit employing the pattern matching circuit of FIG. 6.

FIG. 7 shows exemplary operation-stop/restart timings of the watchdog timer circuit employing the pattern matching circuit 21A of FIG. 6.

Assume here that the microcomputer 2 does not perform, during its normal operation, alternate outputting of the logical values "1" and "0" to the data terminal STN in sync with pulse changes of the refresh signal prun as sent to the refresh terminal PRUN; instead, it outputs a signal having a fixed value equal to logical value "0." Consequently, the value of shift register SFTREG is set to a 4-bit value "0000" irrespective of its initial value after having experienced four pulse changes of the refresh signal prun at a maximum. The value representation of shift register SFTREG is in the order of D flip-flops 63, 62, 61 and 60.

In FIG. 7, under this state, the ignition switch 3 is turned off at time point t1. In responding thereto, the microcomputer 2 executes a standby command. At this time the microcomputer 2 forces, during its processing execution, the refresh signal prun to change in clock whereby the data signal stn is set to logic level "1" at time point t2, to "0" at time t3, to "0" at time t4, and to "1" at time t5 so that reference data "1001" is latched and held in the shift register SFTREG. With this processing, the pattern match signal ptmch is set to high level. Concurrently, the ignition signal ig is set to low level in response to turnoff of the ignition switch 3; the CAN enable signal canena is set to high level due to communication sleep of the communication interface circuit 12. This state satisfies the necessary condition for halt of timer count operation of the watchdog timer circuit; so, the watchdog timer circuit is rendered inoperative. In the standby state of microcomputer 2, the timer count operation of watchdog timer circuit is halted. During it, the watchdog reset instruction is prevented from being generated. Thus, it is possible to suppress wasteful consumption of electric power that is to be used in events that the microcomputer 2 being set in its standby state recovers from the standby state in order to initialize the timer count value of watchdog timer circuit 40 periodically.

When at time point t6 the communication interface circuit 12 undergoes signal transmission thereto, the communication interface circuit 12 wakes up for reception of an incoming data signal(s). In responding thereto, the CAN enable signal canena is changed to low level whereby one necessary condition for interruption of the timer count operation of watchdog timer circuit 40A becomes unsatisfied so that the timer count operation of this watchdog timer circuit 40A gets restarted. Simultaneously, in response to the wakeup of communication interface circuit 12 (wakeup event), the CPU 2A recovers to its operable state from standby state and then outputs a data signal stn of logical value "0" in sync with the refresh signal prun, thereby causing the reference data to change to "0010." The CPU 2A, which has now returned to its normally operable state, operates in accordance with the operation program to continue the operation of outputting the data signal stn of value "0" by making the refresh signal prun to exhibit a pulse change(s) prior to timeout of the watchdog timer circuit 40A.

The restart of the timer count operation of watchdog timer circuit 40A is also enabled by an event that the ignition signal ig changes to high level in response to turn-on of the ignition switch 3 in a similar way to the case of FIG. 4.

Figure 8:
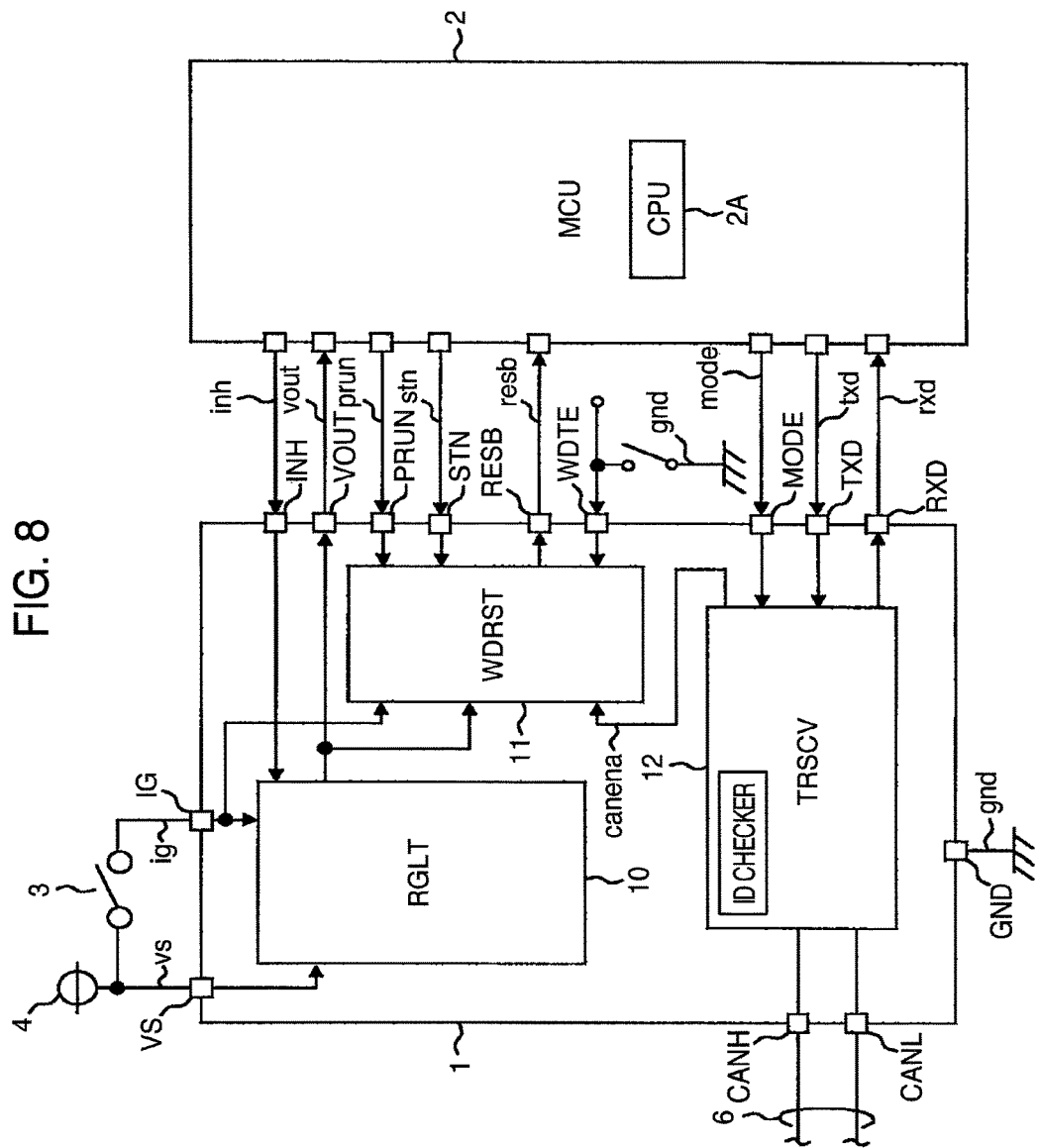
FIG. 8 is a block diagram showing another example of the watchdog timer monitor system.
Figure 9:
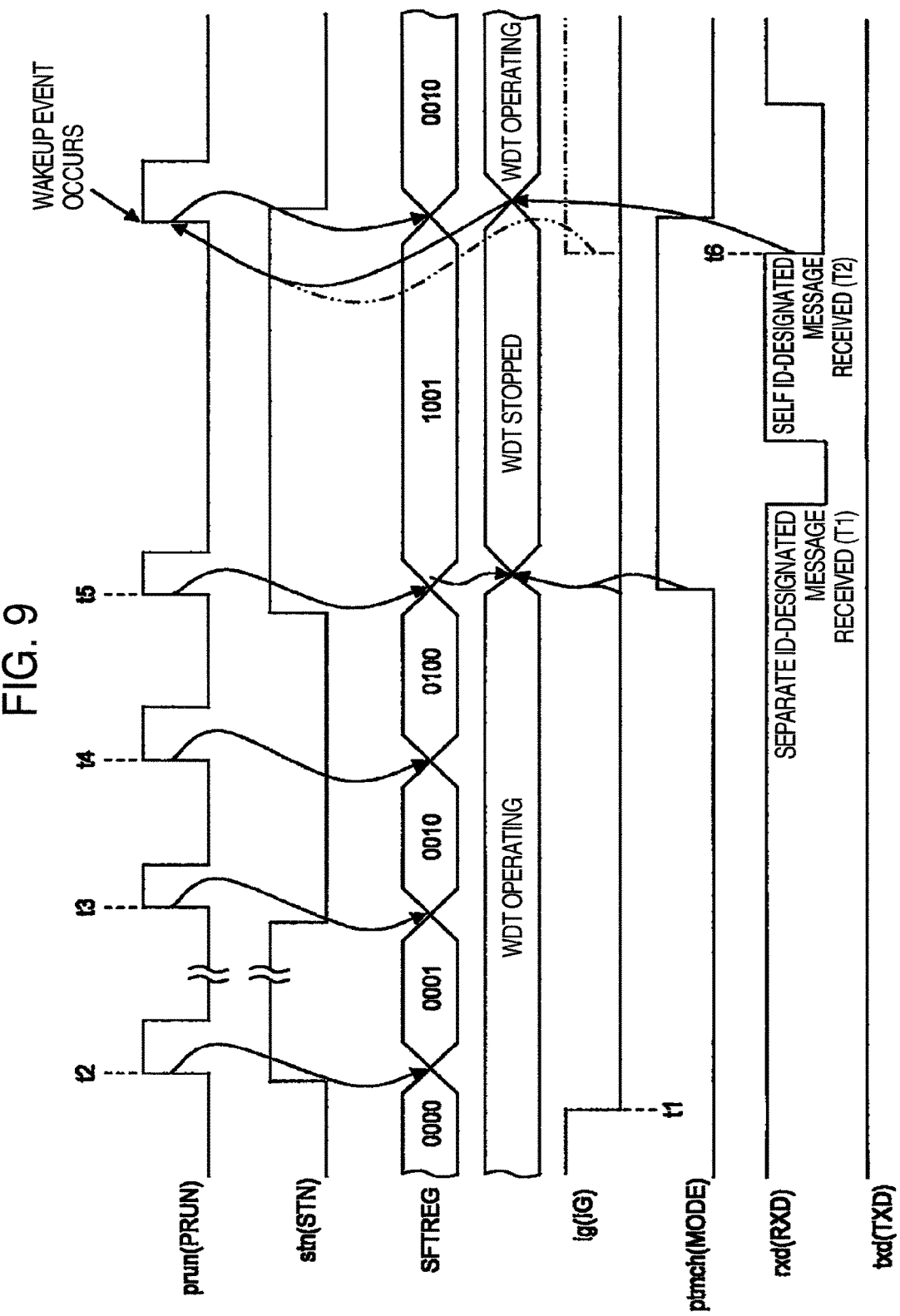
FIG. 9 is a timing chart exemplifying deactivation and restart operation timings of a watchdog timer circuit in the watchdog monitor system of FIG. 8.

A watchdog monitor system shown in FIG. 8 has in the communication interface circuit 12 of FIG. 1 a circuit for checking or "judging" an ID contained in CAN message. Its operation timing chart is shown in FIG. 9. The watchdog monitor system shown in FIG. 8 does not simply restart the timer count operation in mere response to the communication interface circuit's recovery from its communication sleep state after having received a CAN message. This system discriminates an ID contained in the CAN message at the ID check circuit and permits restart of the timer count operation after having verified (T2) that such CAN message is surely targeted at oneself. Alternatively, if the ID check result reveals (T1) that the CAN message is not aimed at oneself, the communication interface circuit goes into the communication sleep state again. By performing this timer count restart operation, the microcomputer and watchdog timer are kept inoperative upon reception of CAN message for another ECU being linked to the CAN network. This makes it possible to maintain the low-power consumption state.

Although not specifically illustrated, the watchdog timer circuit 40A of FIG. 6 is also applicable to the monitor system of FIG. 1 and the power IC of FIG. 2.

While the invention has been particularly shown and described with reference to embodiments thereof, it will be understood by those skilled in the art that the foregoing and other changes in form and details may be made therein without departing from the spirit and scope of the invention.

For instance, the count clock signal may alternatively be supplied from circuitry external to the watchdog timer circuit. Interruption of the timer count operation in the watchdog timer circuit is not limited only to the case of performing it by stopping generation of the count clock signal. The timer count operation halt may also be realized by cutoff of clock transmission using a clock gate that is inserted into a count clock signal transmission line. Note however that as has been explained in connection with the embodiments, it is possible to lower electric power consumed by the clock generator circuit in the case of a control scheme for stopping the clock generation operation performed by the clock generator circuit.

The pattern matching object data for interruption of the timer count operation is not limited to four-bit data and may be data of any other plural numbers of bits. The predefined pattern for count clock stop is modifiable on a case-by-case basis. This pattern is formable as stationary circuitry or is rendered variable by using meltdown fuses.

In cases where the power IC does not have the communication interface circuit, the communication disable state indicated by the signal canena may be excluded from the necessary condition for timer count operation stop. Similarly excludable is the communication enable state which is one of the sufficient conditions for timer count operation restart.

The watchdog timer circuits of the embodiments stated above may also be applied to semiconductor devices other than the power IC. The watchdog timer circuits embodying the invention may also be used while being built in microcomputers or other semiconductor devices of the system-on-chip (SoC) type.

The communication interface is not limited to the controller area network (CAN).

It should be understood that in the case of the above-stated watchdog timer circuitry being applied to in-vehicle systems, there are other applications than the car-body system. For example, in case the watchdog timer circuit is used in a power train system, the ignition switch turnoff state may be excluded from the necessary condition for the timer count operation stop of watchdog timer circuit. Practical examples of the necessary condition of timer count operation stop of watchdog timer circuit and the sufficient condition of timer count operation restart are not limited to those of the above-stated embodiments and may be modified in various ways on a case-by-case basis.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A watchdog monitor system, comprising:
a central processing unit (CPU) that outputs a timer refresh signal and multi-bit timer control data; and
a watchdog reset circuit configured to receive the multi-bit timer control data in synchronization with the timer refresh signal,
wherein the watchdog reset circuit counts a value in synchronization with a clock signal, outputs a reset signal to reset the CPU when the counted value reaches a time-out value, and resets the counted value when the watchdog reset circuit receives the timer refresh signal,
wherein when the CPU goes into a stand-by mode, the CPU outputs predetermined multi-bit timer control data to the watchdog reset circuit, and
wherein the watchdog reset circuit is configured to stop the count when the received multi-bit timer control data is same as the predetermined multi-bit timer control data, and to restart the count when the received multi-bit data becomes non-identical to the predetermined multi-bit timer control data.

2. The watchdog monitor system according to claim 1, wherein when the multi-bit timer control data is a fixed value, the watchdog reset circuit outputs the reset signal.

3. The watchdog monitor system according to claim 2, wherein the fixed value is a logical value "0" or "1".

4. The watchdog monitor system according to claim 1, further comprising an interface circuit,
wherein when the interface circuit receives data, the CPU and the watchdog reset circuit recover to an operation mode from the stand-by mode.

5. The watchdog monitor system according to claim 4, wherein the interface circuit is a controller area network (CAN) transceiver.

6. The watchdog monitor system according to claim 5,
wherein when the CAN transceiver receives a CAN message as the data, the CAN transceiver checks an ID contained in the CAN message, and
wherein when the received ID is identical to an ID of the CAN transceiver, the CPU and the watchdog reset circuit recover to the operation mode from the stand-by mode.

* * * * *